July 15, 1958 F. E. TALMAGE ET AL 2,843,803

VACUUM TUBE INPUT CIRCUIT

Filed March 29, 1956 2 Sheets-Sheet 1

INVENTORS
FRANKLIN E. TALMAGE &
MAX FERYSZKA
BY
Carl V. Olson
ATTORNEY

INVENTORS
FRANKLIN E. TALMAGE &
MAX FERYSZKA
BY
Carl V. Olson
ATTORNEY

United States Patent Office 2,843,803

Patented July 15, 1958

2,843,803

VACUUM TUBE INPUT CIRCUIT

Franklin E. Talmage, Westmont, and Max Feryszka, Haddonfield, N. J., assignors to Radio Corporation of America, a corporation of Delaware Application March 29, 1956, Serial No. 574,779

13 Claims. (Cl. 315—107)

This invention relates to vacuum tube input circuits, and is particularly useful, by way of example only, in a broad-band grounded grid linear amplifier of a television broadcast transmitter operating in the frequency range between 54 and 88 megacycles which corresponds with the lower portion of the VHF television band in the United States.

When the modulated visual radio frequency carrier is amplified prior to application to the radiating antenna, it is necessary to employ a linear amplifier, i. e., one which amplifies equally all the radio frequencies about the carrier in the 5.5 megacycle wide range necessary for carrying the video intelligence. It is also necessary that the input circuit of the linear amplifier present a substantially constant impedance to the preceding stage over the necessary range of frequencies. The impedance matching problem is complicated by the practical necessity of tuning the input circuit for operation at any one of the different television channel frequencies.

It is an object of this invention to provide an improved vacuum tube input circuit which may be adjusted to provide broad-band frequency characteristics at any center frequency within a large range of values.

It is another object to provide a vacuum tube input circuit of relatively simple mechanical construction and improved electrical characteristics.

In one aspect the invention comprises a conductive enclosure having an apertured wall adapted to receive a vacuum tube and provide a radio frequency coupling to the grid flange thereof. The vacuum tube is arranged so that the filamentary cathode terminals extend into the enclosure, and the anode extends in the opposite direction. A coaxial input line extends into the enclosure with the inner conductor terminally connected to the apertured wall near the vacuum tube and with the outer conductor terminated inside the enclosure in spaced relation with the wall. A rectangular parallel conductor transmission line of adjustable length is connected at one end between the outer conductor of the coaxial line and the enclosure to provide variable inductive reactance in shunt with the input coaxial line for tuning purposes. A second rectangular parallel conductor transmission line of adjustable length is connected at one end between the outer conductor of the coaxial line and terminals of blocking capacitors having their other terminals connected to the filamentary cathode terminals of the vacuum tube. The second transmission line provides a variable inductive reactance in series between the input coaxial line and the vacuum tube for impedance matching purposes. The filament power supply leads are taken out of the enclosure thru a conductive channel mounted along the outside of the second transmission line so that radio frequency chokes are not needed.

These and other objects and aspects of the invention will be apparent to those skilled in the art from the following more detailed description taken in conjunction with the appended drawings, wherein.

Figure 1:
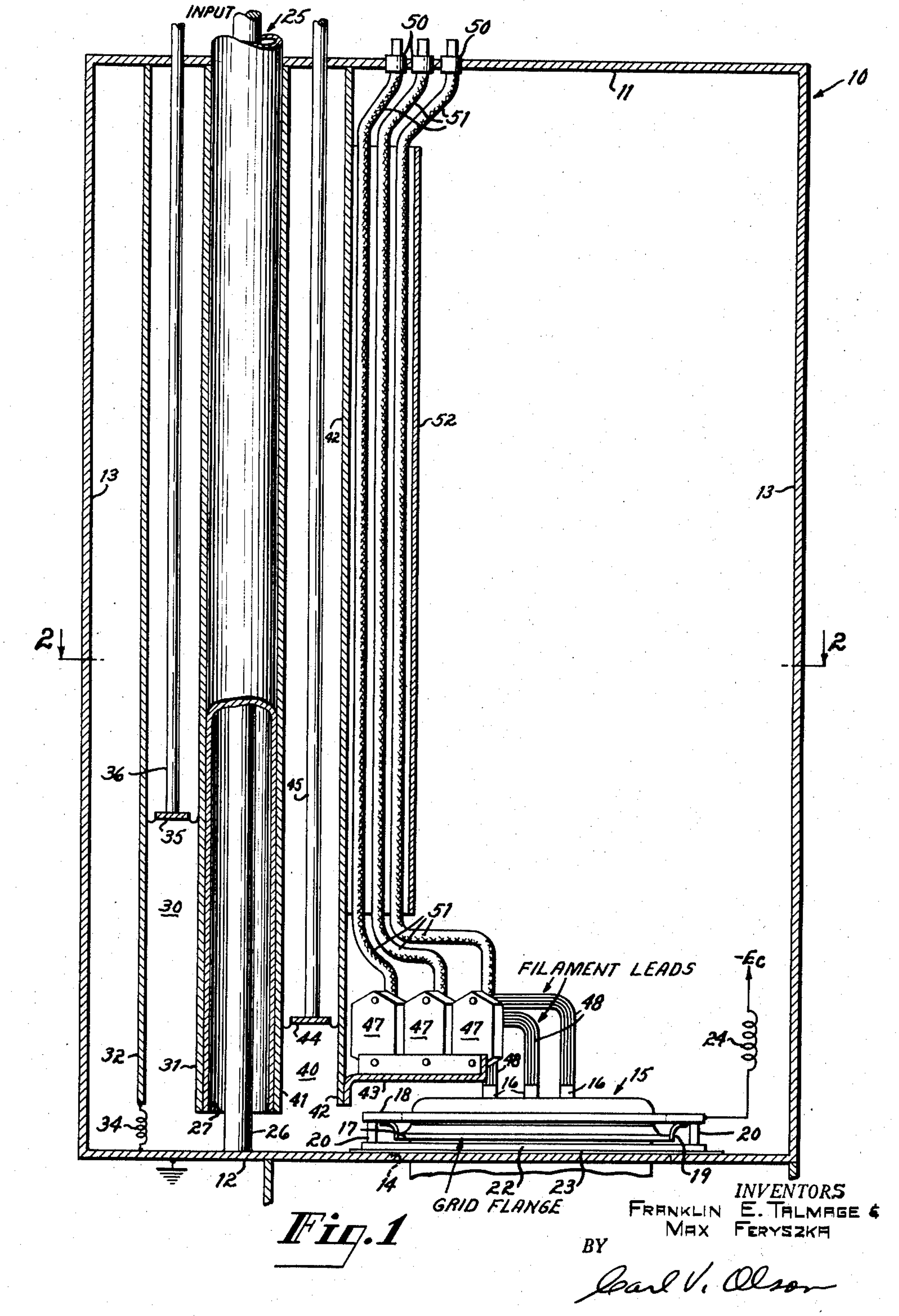
Figure 1 is a sectional view of a vacuum tube input circuit constructed according to the teachings of this invention.
Figure 2:
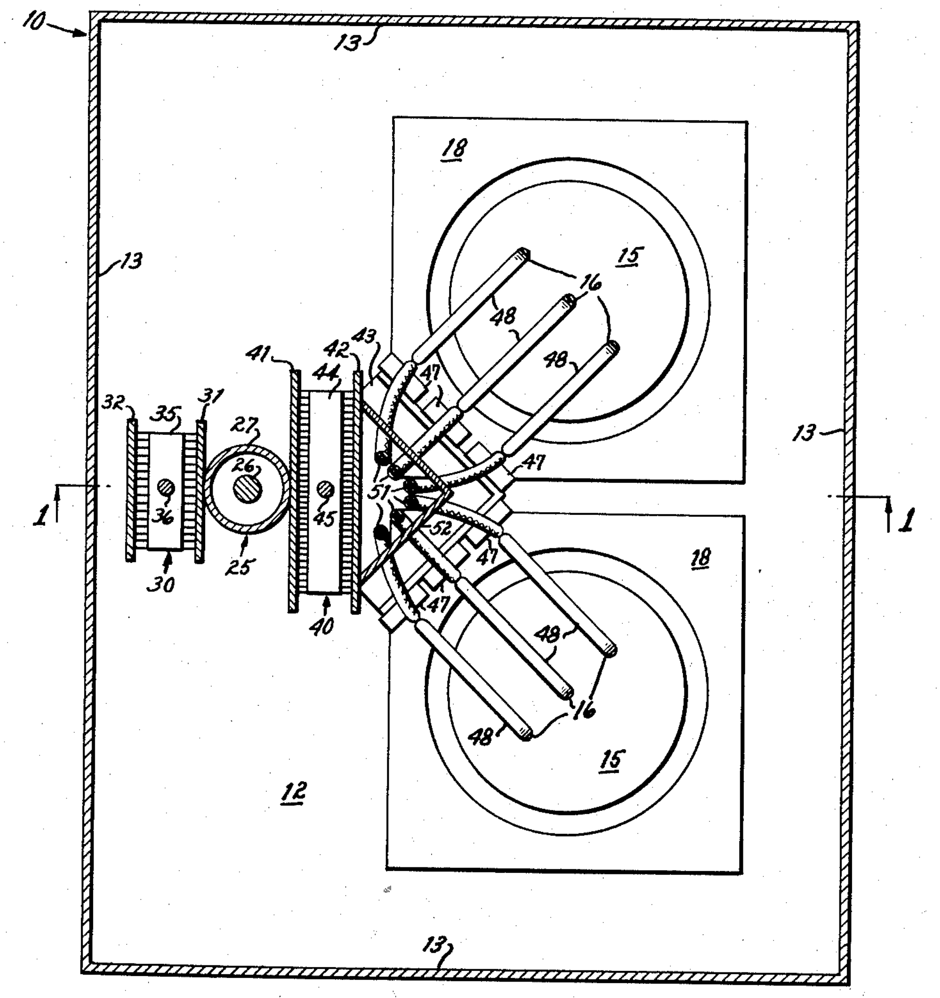
Figure 2 is a sectional view taken on the line 2—2 of Figure 1.

Figures 1 and 2 show an input circuit for two triode vacuum tubes connected in parallel. The circuit includes a conductive enclosure generally designated 10 and including a top wall 11, a bottom wall 12, and side walls 13. The distance between the top wall 11 and the bottom wall 12 is an eighth wavelength or less at the operating frequency. This corresponds with approximately a quarter-wavelength at the frequency of the second harmonic. The distance between the top wall 11 and the bottom wall 12 is such that the enclosure 10 presents a high inductive reactance to the input terminals of the vacuum tubes mounted in the bottom wall 12.

The bottom wall 12 is apertured at 14 to receive the input ends of two vacuum tubes 15. The vacuum tubes may be RCA type 5762 power triodes capable of together providing a signal output of about 6 kilowatts. Each tube has filamentary cathode terminals 16, one of the terminals being the filament center tap, a grid electrode contact flange 17, and an anode (not shown) extending down into an output enclosure below the bottom wall 12 of the input enclosure. A grid contact plate 18 engages the grid flange 17 of the tube thru spring contact fingers 19. The grid contact plate or conductive platform 18 is mounted in spaced relation with a base plate 22 by means of conductive posts 20 to provide an inductance in series with the grid of the vacuum tube, for the purpose of compensating for the anode-cathode capacitance of the vacuum tube. The base plate 22 is insulated from the bottom wall 12 by means of a mica sheet 23 to provide a by-pass capacitor. A source of negative bias potential $-E_c$ is connected thru an *rf* choke 24 to the contact plate 18 and thence thru the contact fingers 19 to the grid flange 17. It will be seen that the vacuum tubes are mounted in the enclosure 10 in such a manner as to provide grounded grid operation.

A coaxial input line 25 extends thru the upper wall 11 into the enclosure and includes an inner conductor 26 extending to, and making contact with, the bottom plate 12. The outer conductor 27 ends in spaced relationship with the bottom wall 12. By this construction, radio frequency input energy is conveyed to the region between the end of the outer conductor 27 and the point on the bottom wall 12 where the terminal end of the inner conductor 26 is connected.

A rectangular parallel conductor transmission line tuning stub 30 is connected in shunt with the terminal end of the input coaxial line 25. The transmission line 30 includes a first strip conductor 31 mounted parallel with and in contact with the outer conductor 27 of the input coaxial line. The terminal end of the strip conductor 31 is effectively connected to the terminal end of the outer conductor 27. The rectangular transmission line 30 includes a second parallel strip conductor 32 having a terminal end in spaced relationship with the bottom wall 12 of the enclosure 10. A lumped inductance 34 in the form of a coil may be connected from the bottom end of the strip conductor 32 to the bottom wall 12 when the circuit is used at the lower end of the tuning range of the circuit. The effective electrical length of the rectangular transmission line 30 is determined by an adjustable tuning element 35 which may be a shorting plate as shown in the drawing. The shorting plate 35 may be moved along the line 30 by means of an operating rod 36 extending out of the enclosure thru the top wall 11. The rectangular transmission line 30 is adjusted in length to tune the input circuit to the desired operating frequency. The line 30 is made longer to tune to a lower frequency by providing a greater inductive reactance in shunt with the input coaxial line 25.

A second rectangular parallel conductor transmission line impedance matching stub 40 is provided for impedance matching purposes. The transmission line 40 includes a first strip conductor 41 parallel to and connected to the outer conductor 27 of the input coaxial line 25. The terminal end of the strip conductor 41 is effectively connected to the terminal end of the outer conductor 27. The terminal end of the strip conductor 42 is connected to a bracket 43. The length of the transmission line 40 is determined by the position of a tuning element 44 operated by a rod 45 extending thru the top wall 11 of the enclosure.

Capacitors 47 are mounted with one of their terminals connected to the conductive bracket 43. The other terminals of the capacitors 47 are connected by means of conductive straps 48 to the filament terminals 16 of the vacuum tubes 15. Capacitors 47 act as radio frequency coupling and direct current blocking capacitors. The adjustable impedance matching transmission line stub 40 is coupled in series between the coaxial line 25 and the input electrodes of the vacuum tube 15 to match the resistive components of the input impedance of the tube to a predetermined impedance suitable for the input line 25. By making the transmission line stub 40 longer, the resistive component of the input impedance of the tube is translated to a higher resistance which is seen by the input line 25. The transmission line stub 40 provides a series inductive reactance which is small compared with the inductive reactance of transmission line 30 and therefore the stub 40 has very little effect on the tuning of the input circuit.

The relationships between the input line 25, the stubs 30 and 40 and the vacuum tube terminals may be summarized as follows. The end of the input coaxial line 25 is arranged with the inner conductor 26 connected to the bottom wall 12 and the outer conductor 27 spaced from the bottom wall 12. The tuning stub 30 is connected in parallel or shunt with the coaxial line by having one conductor 31 connected to the outer conductor 27 of the coaxial line and by having the other conductor 32 connected to the bottom wall 12. The bottom wall 12 is coupled thru the elements 23, 22, 20, 18 and 19 to the grid flange 17 of the vacuum tubes 15. The outer conductor 27 of the input coaxial line is coupled thru the impedance matching stub 40, the bracket 43, the capacitors 47 and the filament straps 48 to the filament terminals 16 of the vacuum tube 15. The impedance matching stub 40 is thus arranged in series between the input coaxial line 25 and the vacuum tubes 15.

Heating power for the filamentary cathode is supplied from outside the enclosure 10 thru by-pass capacitors 50 in the top wall 11 and then thru leads 51 to the upper terminals of the capacitors 47, and thence thru conductive straps 48 to the filament terminals 16 of the tubes 15. The greater part of the length of the leads 51 are within a conductive channel formed by a conductive shield 52 and the strip conductor 42 of the rectangular transmission line 40. The shield 52, 42 is at ground potential so that radio frequency energy is not picked up on the leads 51 therein. Any small amount of radio frequency energy picked up by the leads 51 is by-passed to ground by the leadthru by-pass capacitors 50 in the upper wall 11 of the grounded enclosure 10. By this convenient construction, it is unnecessary to provide the usual radio frequency chokes in the filament leads.

Figure 3:
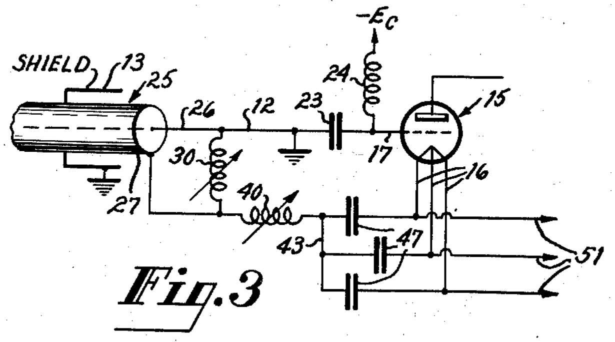
Figure 3 is a circuit diagram approximately corresponding with the input circuit shown in Figures 1 and 2, and is given for the purpose of explanation.

Figure 3 shows an electrical circuit diagram approximating the electrical circuits provided by the structure shown in Figures 1 and 2, and given to explain the operation of the system of the invention. The same reference numerals are applied to the circuit elements in Figure 3 as are employed for the corresponding elements in Figures 1 and 2. In operation, the rectangular transmission line stub 30 is adjusted to provide an inductive reactance which tunes the grid-cathode inter-electrode capacitance of the vacuum tube to resonance at the desired operating frequency. The rectangular transmission line stub 40 is tuned to provide a series inductive reactance which transforms the resistive component of input impedance of the tubes (impedance between cathode and grid terminals) to the desired value for terminating input line 25.

While the invention is illustrated and described in connection with an input circuit for two vacuum tubes operated in parallel, it will be understood that the invention is equally applicable to a circuit including one vacuum tube or more than two vacuum tubes operated in parallel. According to this invention there is provided an improved vacuum tube input circuit which combines simplicity and economy in manufacture with improved electrical characteristics necessary in an amplifier for handling relatively broadband signals at any frequency within an extended tuning range.

What is claimed is:

1. An input circuit for a vacuum tube having a cathode electrode terminal and a grid electrode flange, said circuit comprising a conductive enclosure with an apertured wall adapted to receive a vacuum tube, said enclosure being coupled to the grid flange thereof, a coaxial input line having inner and outer conductors extending into said enclosure, with one conductor coupled to said wall and thru the same to said grid flange; a first transmission line having two conductors coupled to respective ones of the conductors of said coaxial input line to provide a reactance in shunt therewith; and a second transmission line having one conductor coupled to one of the conductors of said coaxial input line and the other conductor coupled to said cathode terminal to provide a reactance in series between the input line and the electrodes of the vacuum tube.

2. An input circuit for a vacuum tube having a cathode electrode terminal and a grid electrode flange, said circuit comprising a conductive enclosure with an apertured wall adapted to receive a vacuum tube, said enclosure being coupled to the grid flange thereof, a coaxial input line having inner and outer conductors extending into said enclosure, with one conductor coupled to said wall and through the same to said grid flange; a first transmission line having two conductors coupled to respective ones of the conductors of said coaxial input line; means to vary the length of said transmission line to provide a variable inductive reactance in shunt with the coaxial input line, a second transmission line having one conductor coupled to one of the conductors of said coaxial input line and the other conductor coupled to said cathode terminal; and means to vary the length of said second transmission line to provide a variable inductive reactance in series between the input line and the electrodes of the vacuum tube.

3. An input circuit for a vacuum tube having a cathode electrode terminal and a grid electrode flange, said circuit comprising a conductive enclosure with an apertured wall adapted to receive a vacuum tube, said enclosure being coupled to the grid flange thereof, a coaxial input line having inner and outer conductors extending into said enclosure, with one conductor coupled to said wall and through the same to said grid flange; a first rectangular two-conductor transmission line having two strip conductors coupled to respective ones of the conductors of said coaxial input line to provide a reactance in shunt therewith; and a second rectangular two-conductor transmission line having one strip conductor coupled to one of the conductors of said coaxial input line and the other strip conductor coupled to said cathode terminal to provide a reactance in series between the input line and the vacuum tube electrodes.

4. An input circuit for a vacuum tube having a cathode electrode terminal and a grid electrode flange, said circuit comprising a conductive enclosure with an apertured wall adapted to receive a vacuum tube, said enclosure being coupled to the grid flange thereof, a coaxial input line having inner and outer conductors extending into said enclosure, with the end of the inner conductor connected to said wall; a first rectangular two-conductor transmission line having one strip conductor parallel to and in contact with the outer conductor of said coaxial input line and the other strip conductor in parallel spaced relation therewith to provide a reactance in shunt with said input coaxial line; and a second rectangular two-conductor transmission line having one strip conductor connected to the outer conductor of said coaxial input line and the other strip conductor coupled to said cathode terminal to provide a reactance in series between the coaxial input line and the vacuum tube electrodes.

5. An input circuit for a vacuum tube having filamentary electrode cathode terminals and a grid electrode flange, said circuit comprising a conductive enclosure with an apertured wall adapted to receive a vacuum tube, said enclosure being coupled to the grid flange thereof, a coaxial input line having inner and outer conductors extending into and thru said enclosure, with the end of the inner conductor connected to said wall and with the outer conductor ending in spaced relation with said wall; a first transmission line having two spaced strip conductors one of which is in contact along its length with the outer conductor of said coaxial input line to provide an inductive reactance in shunt therewith; a second transmission line having two spaced strip conductors one of which is in contact along its length with the outer conductor of said coaxial input line and the other of which is coupled to said cathode terminals to provide an inductive reactance in series between the coaxial input line and the vacuum tube electrodes, a conductive shielding channel along one strip conductor of said second transmission line, and filament power supply leads extending from said cathode terminals thru said channel and out of said enclosure.

6. An input circuit for a vacuum tube having filamentary cathode terminals and a grid flange, said circuit comprising a conductive enclosure including first and second walls, said second wall being apertured to receive a vacuum tube and being coupled to the grid flange thereof; a coaxial input line extending thru said first wall, said line including an inner conductor coupled to said second wall and through the same to said grid flange and also including an outer conductor ending in spaced relation with said second wall; a first transmission line having one conductor coupled to the outer conductor of said input coaxial line and another parallel conductor coupled to said enclosure; means to vary the electrical length of said first transmission line, whereby an adjustable inductive reactance is coupled in shunt with said input coaxial line, a second transmission line having one conductor coupled to the outer conductor of said input coaxial line and having another parallel conductor; a capacitor coupling said other conductor of said second transmission line to said cathode terminals, means to vary the electrical length of said second transmission line, whereby inductive reactance is provided in series between said input line and said vacuum tube, a conductive channel mounted on said other conductor of said second transmission line, and filament power supply leads extending thru said channel to said filamentary cathode terminals.

7. An input circuit for a vacuum tube having filamentary cathode terminals and a grid flange, said circuit comprising a conductive enclosure including first and second walls, said second wall being apertured to receive a vacuum tube; a conductive platform mounted on said second wall and coupled to the grid flange of said vacuum tube, a coaxial input line extending thru said first wall, said line including an inner conductor coupled to said second wall and through the same to said grid flange and also including an outer conductor ending in spaced relation with said second wall; a first transmission line having one conductor coupled to the outer conductor of said input coaxial line and another parallel conductor coupled to said enclosure; means to vary the electrical length of said first transmission line, whereby an adjustable inductive reactance is coupled in shunt with said input coaxial line, a second transmission line having one conductor coupled to the outer conductor of said input coaxial line and having another parallel conductor; a capacitor coupling said other conductor of said second transmission line to said cathode terminals, means to vary the electrical length of said second transmission line, whereby inductive reactance is provided in series between said input line and said vacuum tube, a conductive channel mounted on said other conductor of said second transmission line, and filament power supply leads extending thru said channel to said filamentary cathode terminals.

8. An input circuit for a vacuum tube having a cathode terminal and a grid flange, said circuit comprising a conductive enclosure having first and second walls, said second wall being apertured to receive a vacuum tube and being coupled to the grid flange thereof; a coaxial input line extending thru said first wall, said line including an inner conductor having its terminal end connected to said second wall and also including an outer conductor ending in spaced relation with said second wall; a first inductive transmission line stub coupled in shunt with said input coaxial line, a second inductive transmission line stub having one conductor connected at its terminal end to the terminal end of the outer conductor of said input coaxial line and also having another parallel conductor; and a capacitor coupling the terminal end of said other conductor to the cathode terminal of said vacuum tube, whereby inductive reactance is provided in series between said input coaxial line and said vacuum tube terminal.

9. An input circuit for a vacuum tube having a cathode terminal and a grid flange, said circuit comprising a conductive enclosure having a wall, said wall being apertured to receive a vacuum tube and being coupled to the grid flange thereof; a coaxial input line extending into and thru said enclosure to said wall, said line including an inner conductor connected to said wall and including also an outer conductor ending in spaced relation with said wall; a first inductive transmission line stub coupled in shunt with said input coaxial line, a blocking capacitor having one terminal connected to said cathode terminal; and a second inductive transmission line stub coupled in series between said input coaxial line and other terminal of said blocking capacitor.

10. An input circuit for a vacuum tube having a cathode terminal and a grid flange, said circuit comprising a conductive enclosure having a wall, said wall being apertured to receive a vacuum tube and being coupled to the grid flange thereof; a coaxial input line extending into and thru said enclosure to said wall, said line including an inner conductor connected to said wall and including also an outer conductor ending in spaced relation with said wall; a first adjustable transmission line stub coupled in shunt with said input coaxial line, a blocking capacitor having one terminal connected to said cathode terminal; and a second adjustable inductive transmission line stub coupled in series between said input coaxial line and the other terminal of said blocking capacitor.

11. A circuit for a vacuum tube having a first electrode terminal and a second electrode contact flange, said circuit comprising a conductive enclosure having a wall, said wall being apertured to receive a vacuum tube and being coupled to the contact flange thereof; a coaxial line extending into and thru said enclosure to said wall, said line including an inner conductor coupled to said wall and including also an outer conductor ending in spaced relation with said wall; a tuning stub coupled in shunt with said coaxial line at the end thereof near said wall, and an impedance matching stub coupled in series between said end of said coaxial line and said vacuum tube electrode terminal.

12. A circuit for a vacuum tube having first and second electrode terminals, said circuit comprising a transmission line; a transmission line tuning stub coupled in shunt with said transmission line, and a transmission line matching stub coupled in series between said transmission line and said electrode terminals.

13. A vacuum tube input circuit for a broadband grounded grid linear amplifier of a television transmitter operating in the frequency range of 54 to 88 megacycles, said circuit comprising a plurality of vacuum tubes each having cathode terminals and a grid electrode contact flange; a conductive enclosure having first and second walls, said second wall being apertured to receive said vacuum tubes and being coupled to the grid flanges thereof; a coaxial input line extending thru said first wall, said line including an inner conductor having its terminal end connected to said second wall and including also an outer conductor ending in spaced relation with said second wall; a first inductive transmission line tuning stub coupled in shunt with said input coaxial line, a second inductive transmission line impedance matching stub having one conductor connected at its terminal end to the terminal end of the outer conductor of said input coaxial line and also having another parallel conductor; and capacitors coupling the terminal end of said other parallel conductor to the cathode terminals of said vacuum tube, whereby series inductive reactance is provided by said second stub between said input coaxial line and said vacuum tube terminals.

References Cited in the file of this patent

UNITED STATES PATENTS

| | | |
|---|---|---|
| 2,320,958 | Usselman | June 1, 1943 |
| 2,488,948 | Veazie | Nov. 22, 1949 |
| 2,500,504 | Antalek | Mar. 14, 1950 |
| 2,697,799 | Svensson | Dec. 21, 1954 |